(12) United States Patent
Endler et al.

(10) Patent No.: US 12,437,079 B2
(45) Date of Patent: Oct. 7, 2025

(54) BROWSER SESSION SECURITY SYSTEM

(71) Applicant: SpyCloud, Inc., Austin, TX (US)

(72) Inventors: David Endler, Austin, TX (US); Jacob Wagh, Austin, TX (US); Nick Brands, Austin, TX (US)

(73) Assignee: SpyCloud, Inc., Austin, TX (US)

( * ) Notice: Subject to any disclaimer, the term of this patent is extended or adjusted under 35 U.S.C. 154(b) by 247 days.

(21) Appl. No.: 18/158,971

(22) Filed: Jan. 24, 2023

(65) Prior Publication Data

US 2024/0248997 A1    Jul. 25, 2024

(51) Int. Cl.
*G06F 21/57*    (2013.01)
*G06F 16/9538*    (2019.01)
*G06F 21/62*    (2013.01)

(52) U.S. Cl.
CPC ........ *G06F 21/577* (2013.01); *G06F 16/9538* (2019.01); *G06F 21/6263* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 11,283,832 B2 | 3/2022 | Endler | |
| 11,399,021 B2 | 7/2022 | Endler et al. | |
| 11,438,360 B2 | 9/2022 | Endler et al. | |
| 11,461,458 B2 | 10/2022 | Endler et al. | |
| 11,503,056 B1 * | 11/2022 | Celiesius | H04L 63/1425 |
| 11,558,409 B2 | 1/2023 | Endler et al. | |
| 11,750,645 B2 | 9/2023 | Endler et al. | |
| 11,888,843 B2 | 1/2024 | Endler et al. | |
| 2001/0045451 A1 * | 11/2001 | Tan | G06Q 20/12 |
| | | | 235/375 |
| 2009/0144806 A1 * | 6/2009 | Gal | H04L 63/083 |
| | | | 726/3 |
| 2017/0262629 A1 * | 9/2017 | Xu | G06F 21/56 |
| 2020/0279041 A1 * | 9/2020 | Endler | G06F 21/554 |
| 2020/0279050 A1 | 9/2020 | Endler | |
| 2021/0392132 A1 * | 12/2021 | Olden | H04L 67/1095 |
| 2024/0007500 A1 | 1/2024 | Endler et al. | |
| 2024/0037279 A1 * | 2/2024 | Marudi | G06F 21/602 |

OTHER PUBLICATIONS

Related U.S. Appl. No. 18/152,186, filed Jan. 10, 2023, 56 pages.
Related U.S. Appl. No. 18/543,916, filed Dec. 18, 2023, 84 pages.
(Continued)

*Primary Examiner* — Scott B Christensen
(74) *Attorney, Agent, or Firm* — Pillsbury Winthrop Shaw Pittman, LLP

(57) ABSTRACT

A process that includes receiving a session identity protection query that includes a target domain. The process further includes accessing a security database of compromised cookie data associated with a plurality of domains and determining the target domain is associated with first compromised cookie data of the compromised cookie data included in the security database. The process includes providing the first compromised cookie data in response the session identity protection query.

20 Claims, 7 Drawing Sheets

(56) References Cited

OTHER PUBLICATIONS

Related International Patent Application PCT/US2024/012817, filed Jan. 24, 2024, 49 pages.
Related U.S. Appl. No. 62/753,812, filed Oct. 31, 2018, 76 pages.
Related U.S. Appl. No. 62/753,807, filed Oct. 31, 2018, 81 pages.
Related U.S. Appl. No. 62/753,800, filed Oct. 31, 2018, 77 pages.
Related U.S. Appl. No. 62/753,793, filed Oct. 31, 2018, 82 pages.
Related U.S. Appl. No. 62/812,205, filed Feb. 28, 2019, 90 pages.
Related U.S. Appl. No. 62/812,208, filed Feb. 28, 2019, 87 pages.
Web Archive of SpyCloud's Integrations Webpage, "SpyCloud Integrations," https://web.archive.org/web/20211209033946/https://spycloud.com/products/integrations/, Dec. 9, 2021, 20 pages.
Web Archive of SpyCloud Products Webpage, "Take Action Before the Criminals Do," https://web.archive.org/web/20220124200326/https://spycloud.com/products/, Oct. 23, 2021, 13 pages.
Web Archive of SpyCloud's Consumer ATO Prevention Product Webpage, "Protect Your Customers from Account Takeover Fraud," https://web.archive.org/web/20211209032750/https://spycloud.com/products/consumer-ato-prevention/, Dec. 9, 2021, 8 pages.
Web Archive of SpyCloud's Employee ATO Prevention Product Webpage, "Reduce Your Risk of a Data Breach with Employee Account Takeover Prevention," https://web.archive.org/web/20211209043359/https://spycloud.com/products/employee-ato-prevention/, Dec. 9, 2021, 10 pages.
Web Archive of SpyCloud's Third Party Insight Product Webpage, "Reduce Your Risk of a Data Breach with SpyCloud Third Party Insight," https://web.archive.org/web/20211209041042/https://spycloud.com/products/third-party-insight/, Dec. 9, 2021, 12 pages.
Web Archive of SpyCloud's Fraud Investigations Product Webpage, "Transform Your Online Fraud Investigations," https://web.archive.org/web/20211209040150/https://spycloud.com/products/fraud-investigations/, Dec. 9, 2021, 8 pages.
Web Archive of SpyCloud's API, "Data Delivered However You Need It," https://web.archive.org/web/20211023004614/https://spycloud.com/products/spycloud-api/, Oct. 23, 2021, 5 pages.
Web Archive of SpyCloud's Active Directory Guardian Product Webpage, "Protect Your Enterprise from Account Takeover with Active Directory Guardian," https://web.archive.org/web/20211209035439/https://spycloud.com/products/active-directory-guardian/, Dec. 9, 2021, 14 pages.
Web Archive of SpyCloud's VIP Guardian Product webpage, "Protect Your Highest-Risk Executives from Targeted Account Takeover," https://web.archive.org/web/20211209043814/https://spycloud.com/products/vip-guardian/, Dec. 9, 2021, 11 pages.
Web Archive of SpyCLoud's Data Integration Product Webpage, "Data Partnerships with SpyCloud," https://web.archive.org/web/20211209040506/https://spycloud.com/data-partnerships/, Dec. 9, 2021, 11 pages.

\* cited by examiner

BROWSER SESSION SECURITY SYSTEM

CROSS-REFERENCE TO RELATED APPLICATIONS

None

BACKGROUND

1. Field

The present disclosure relates generally to cybersecurity and, more specifically, to identifying and invalidating stolen browser sessions.

2. Description of the Related Art

Computer-security professionals are losing the battle to prevent use of stolen or otherwise exposed security credentials, such as passwords, by which users are authenticated by computer networks. In part, this is due to poor, prevalent password hygiene. People tend to reuse passwords or use low-entropy variations. And these passwords (a term used generically herein to refer to knowledge-factor and biometric security credentials), along with associated user identification, can be easily exposed or stolen, which can help threat actors access various sensitive accounts related to a user. A report by Verizon™ in 2017 indicated that 81% of hacking-related breaches leveraged either stolen or weak passwords and in July 2017 Forrester™ estimated that account takeovers would cause at least $6.5 billion to $7 billion in annual financial losses across industries. Other attack vectors include brute force attacks. Modern GPU's and data structures like rainbow tables facilitate password cracking at rates that were not contemplated when many security practices were engineered. Still other attack vectors include malware captured session cookies and credentials that may allow malicious actors to impersonate a legitimate user. Malicious actors can sell resulting tested credentials on the dark web, making it relatively easy to monetize user credentials and incentivizing even more password cracking. Various malicious buyers of this information may use password and user identification combinations in order to breach and retrieve highly confidential information.

To impede these attacks, online services like "Have I Been Pwned" have arisen. Such systems maintain a database of breached credentials and expose an interface by which the records may be interrogated by users seeking to determine if their credentials have been compromised. Such systems, however, are often too rarely accessed, particularly in the context of enterprise networks, where highly valuable information can be exfiltrated relatively quickly after credentials are compromised. And responses to detected threats are often not fully implemented, as propagating appropriate changes throughout an enterprise network can be relatively high-latency and complex.

SUMMARY

Accordingly, there is a need to identify and retrieve exposed or stolen browser session logs (e.g., cookies) associated with a domain and invalidate those browser sessions before malicious activity takes place.

The following is a non-exhaustive listing of some aspects of the present techniques. These and other aspects are described in the following disclosure.

Some aspects include a process, including: receiving, by a computer system, a session identity protection query that includes a target domain; accessing, by the computer system, a security database of compromised cookie data associated with a plurality of domains; determining, by the computer system, the target domain is associated with first compromised cookie data of the compromised cookie data included in the security database; and providing, by the computer system, the first compromised cookie data in response to the session identity protection query.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
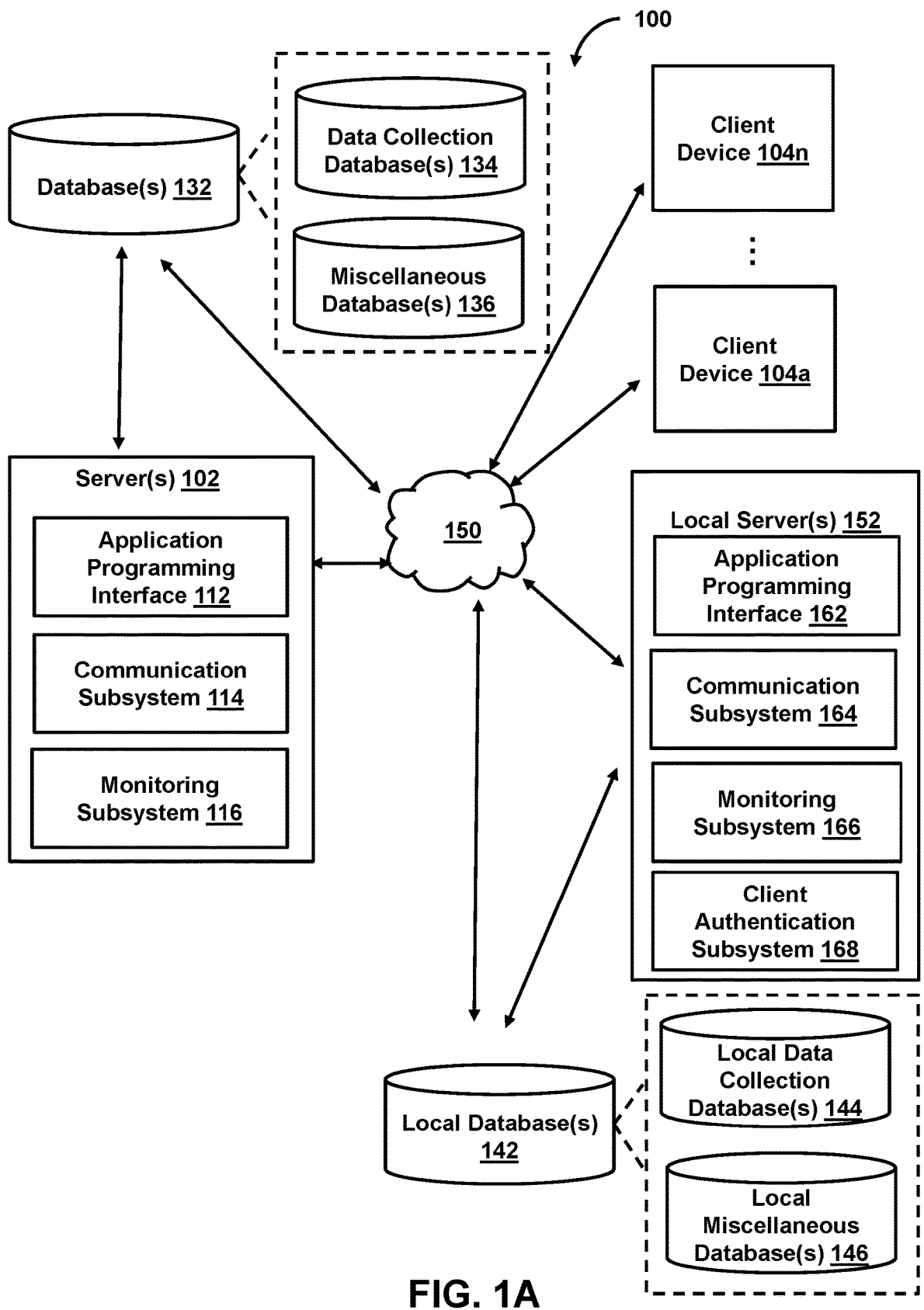
FIG. 1A is a logical and physical architecture block diagram showing an example system for facilitating identification and invalidation of stolen browser sessions, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, it should be understood that some embodiments are problem-specific, and not all embodiments address every problem with traditional systems described herein or provide every benefit described herein. That said, improvements that solve various permutations of these problems are described below. Some aspects of the present techniques may be described below under different headings in all-caps. These techniques may be used together or independently (along with the description above), which is not to suggest that other descriptions are limiting.

Online fraud threats have skyrocketed in recent years, with losses now predicted to exceed $206 billion by 2025. As fraud increases in both prevalence and sophistication, even enterprises with strong fraud prevention programs struggle to confidently distinguish real consumers from cybercriminals. Businesses are missing a crucial element in their control frameworks: visibility of stolen information that enables criminals to evade detection and perpetrate account takeover, identity fraud, and new account fraud. Specifically, malware-stolen data often results in fraud. Malware bot logs may provide malicious actors with the information they need to impersonate a website's users and sidestep anti-fraud measures like multi-factor authentication. Logs siphoned from malware may include authentication data, like credentials or cookies, as well as system data that a malicious actor may use to fool anti-fraud solutions. Criminals can use these logs to commit several kinds of fraud such as, for example, account takeover, synthetic identities, card not present fraud, identity theft, triangulation fraud, and other malicious activity. Specifically, cookies (generally referred to as browser files herein) along with other data can be used by malicious actors for account takeover such that stolen browser sessions can be used to bypass multi-factor authentication (MFA) and third-party services. Cookies are used by many sites to remember "trusted devices" so that MFA or credentials are not required at next login. These session cookies or "devices" cookies for cookies that remember the device for a particular time such that MFA is not required every time the user accesses a website, may be active for extended periods such as a week, two weeks, a month, two months or any other time period. Bypassing MFA allows malicious users to access high-valued accounts with only requiring stolen credentials, which also can be discovered by malware or other password cracking techniques.

Stolen cookies give criminals everything they need to impersonate a user, down to their browser fingerprints. Malware typically generates logs of information from an infected user device. For example, malware logs also include information like the user's passwords, passkey information or other FIDO and WebAuthn security standard based security information that may be used to bypass a passkey authentication history, form fills—and their cookies. The infected user's system information may also be captured. This gives the bad actor everything they need for that user's browser fingerprint, which is the information a lot of bot detection and anti-fraud solutions use to identify suspicious traffic. These solutions look at things like a user's browser version, operating system, time zone, language settings, screen size, and other data points. If those tools see that a user's fingerprint changes from one login to the next, it's an indication of fraud and the user might get hit with a security challenge. With access to the certain data and cookies, a criminal can bypass those checks and which can allow a criminal to be completely indistinguishable from the victim.

Malicious actors then operationalize stolen cookies using anti-detect browsers, which the actor my use multiple real user's browser fingerprints, provide anonymity in traffic arbitration, guarantee complete confidentiality, and allow criminals to work with multiple accounts at the same time in one profile.

Some embodiments mitigate some of the above-described issues (or other problems described below or that will be self-evident to those in the field) by integrating a repository of available user information assets that may include malware logs that include cookies. In response to a query, a session identity protection engine may retrieve cookies or other browser files from the repository as well as other user information associated with the cookie. The session identity protection engine may return the cookie as well as other user information assets to the domain server or administrator that generated the query and invalidate compromised sessions or flag user accounts with known compromised devices for increased scrutiny. It should be noted, though, that several independently useful techniques are described herein, and embodiments consistent with the present disclosure are not limited to those that implement this approach, which is not to suggest that any other description is limiting.

FIG. 1A illustrates a computing environment 100 having components configured to identify compromised browser sessions from browser files, such as cookies, provided in malware logs and provide the compromised browser session data as well as information that can be used to identify affected accounts such that an enterprise can flag vulnerable accounts or invalidate the browser sessions. As illustrated in FIG. 1A, computing environment 100 may include servers 102, client devices 104*a*-104*n*, databases 132, local databases 142, and local servers 152. Server 102 may expose an application programming interface (API) 112 such as a session identity protection API and include a communication subsystem 114 and a monitoring subsystem 116. The monitoring subsystem 116 may include a session identity protection engine that may perform the functionalities of the session identity protection engine or servers 102 discussed in more detail below (e.g., receive session identity protection API calls, obtaining user information and cookies based on a domain and other information fields included in the session identity protection API calls, and providing those sessions and cookie related information in response to the session identity protection query). Local server 152 may expose an API 162 and include a communication subsystem 164, a monitoring subsystem 166, a client authentication subsystem 168, or other components (which is not to suggest that other lists are limiting). In some embodiments, the monitoring subsystem 166 perform security actions based on received compromised cookie data.

Three client devices are shown, but commercial implementations are expected to include substantially more, e.g., more than 100, more than 1,000, or more than 10,000. Each client device 104 may include various types of mobile terminal, fixed terminal, or other device. By way of example, client device 104 may include a desktop computer, a notebook computer, a tablet computer, a smartphone, a wearable device, or other client device. Users may, for instance, use one or more client devices 104 to interact with one another, one or more servers, or other components of computing environment 100. It should be noted that, while one or more operations are described herein as being performed by particular components of server 102 or local server 152, those operations may, in some embodiments, be performed by other components of server 102, local server 152, or other components of computing environment 100. As an example, while one or more operations are described herein as being performed by components of server 102 or local server 152, those operations may, in some embodiments, be performed by components of client device 104. Further, although the database 132 and local database 142 are illustrated as being separate from the server 102, local server 152, and the client device 104, the database 132 and the local database 142 may be located within the client device 104, server 102, or local server 152.

Figure 1B:
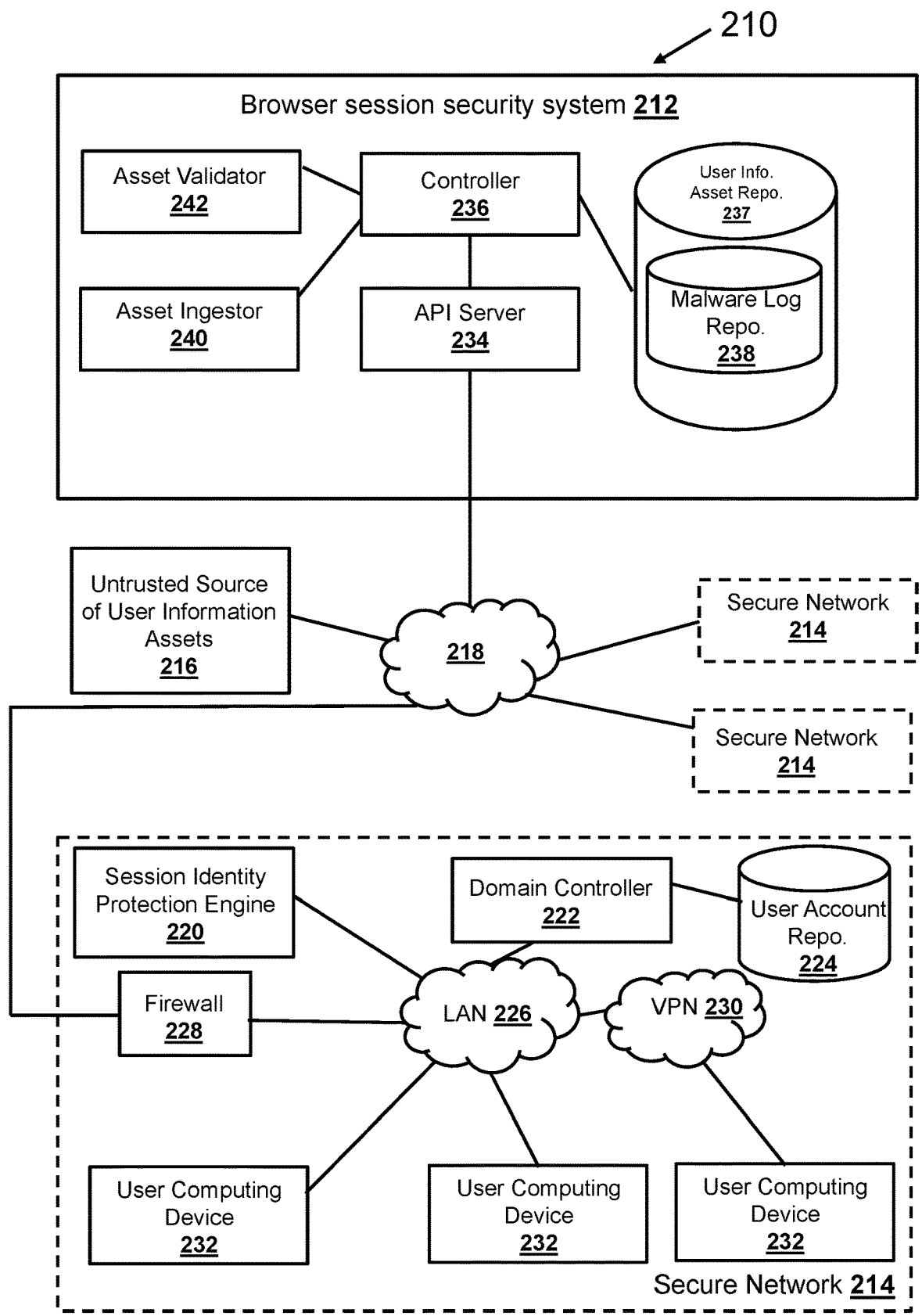
FIG. 1B is a logical and physical architecture block diagram showing another example system for facilitating identification and invalidation of stolen browser sessions, in accordance with some embodiments of the present disclosure.

FIG. 1B is a logical and physical architecture block diagram showing another example of a computing environment 210 having a browser session security system 212 and a session identity protection engine 220 configured to mitigate some of the above-described problems. In some embodiments, the computing environment 210 is, in some aspects, a more specific version of that described above in FIG. 1A. In some embodiments, the computing environment 210 includes the browser session security system 212, a plurality of different secure networks 214, an untrusted source of user information assets 216, and a public network, like the Internet 218.

Three secure networks 214 are shown, though embodiments are consistent with substantially more. In some embodiments, each secure network 214 may correspond to a different secure network of a different tenant account subscribing to services from the browser session security system 212, for example, in a software as a service offering, or some embodiments may replicate some or all of the browser session security system 212 on-premises. In some embodiments, each of the secure networks 214 may define a different secure network domain in which authentication and authorization determinations are independently made, for instance, a user authenticated on one of the secure networks 214 may not be afforded any privileges on the other secure networks 214 in virtue of the authentication. In some cases, each secure network 214 may be a different enterprise network, for instance, on a private subnet hosted by a business or other organization.

In some embodiments, the secure network 214 may include the above-noted session identity protection engine 220, a domain controller 222, a user account repository 224, a private local area network 226, a firewall 228, a virtual private network connection 230, various user computing devices 232, and in some cases various network-accessible resources hosted within the secure network for which access is selectively granted by the domain controller 222 responsive to authorization and authentication determinations based on user credentials. Generally, authentication is based on confirming the identity of an entity, and authorization is based on whether that entity is permitted to access resources in virtue of being authenticated. In some embodiments, the user computing devices 232 may be physically co-located, or some user computing devices may be remote, for instance, those connecting via a virtual-private network (VPN) connection 230. Three user computing devices 232 are shown, but commercial implementations are expected to include substantially more, and in some cases with substantially more remote computing devices connecting via a plurality of different VPN connections. In some embodiments, the local area network 226 may be addressed by a range of private Internet Protocol addresses assigned to the various illustrated computing devices, and in some cases, those same private Internet Protocol addresses may be used on other secure networks 214, for instance, behind a network address translation table implemented by the firewall 228 or a router.

In some embodiments, the domain controller 222 is an Active Directory™ domain controller or other identity management service configured to determine whether to service authentication requests from user computing devices 232 or other network resources (e.g., computing devices hosting services to which the user computing devices 232 seek access). In some embodiments, the domain controller 222 may receive requests including a username and one or more security factors, like a knowledge factor credential, such as a password, a pin code, or in some cases, a value indicative of a biometric measurement. The terms "password" and "credential" refer both to the plain-text version of these values and cryptographically secure values based thereon by which possession of the plain-text version is demonstrated, e.g., a cryptographic hash value or ciphertext based on a password. Thus, in some embodiments, these inputs may be received in plain-text form, or cryptographic hash values based thereon, for instance, calculated by inputting one of these values and a salt value into a SHA 256 cryptographic hash function or the like, may serve as a proxy.

In some embodiments, the domain controller 222 may respond to authentication requests by retrieving a user account record from the repository 224 corresponding to the username (a term which is used to refer broadly to refer to values, distinct from knowledge-factor credentials, by which different users are distinguished in a username space, and which may include pseudonymous identifiers, email-addresses, and the like) in association with the request. In some embodiments, in response to the request, the domain controller 222 may determine whether a user account associated with the username (e.g., uniquely associated) indicates that the user account has a valid set of credentials associated therewith, for instance, that a password has been registered and has not been designated as deactivated, e.g., by setting a flag to that effect in the account to deactivate a previously compromised (e.g., breached, phished, or brute forced) password. In response to determining that the user account does not have a valid set of credentials associated therewith, some embodiments may respond to the requests by denying the request, and supplying instructions to populate a user interface by which new credentials may be registered and stored in the user account.

In some embodiments, in response to determining that the user account has valid credentials, the domain controller 222 may then determine whether the credentials associated with the request for authentication match those in the user account record, for instance, whether the user demonstrated possession of a password associated with the username in the user account. Possession may be demonstrated by supplying the password in plain text form or supplying a cryptographic hash thereof. In some embodiments, passwords are not stored in plaintext form in the user account repository and cryptographic hashes of passwords in the user account are compared to cryptographic hashes of user input credentials to determine whether the user has demonstrated possession of the password. In response to determining that the credentials associated with the request do not match those in the user account, in some embodiments, the domain controller 222 may respond to the request by transmitting a signal indicating that the request is denied to the requesting user computing device 232.

In some embodiments, in response to determining that the credentials supplied with the request match those in the user account, some embodiments may respond to the request by authenticating the user and, in some cases, authorizing (or causing other services to authorize) various forms of access to network resources on the secure network, including access to email accounts, document repositories, network attached storage devices, and various other network-accessible services accessible (e.g., exclusively) on the secure network 214 (e.g., selectively based on the requestor's identity). As described herein such workflows may be referred to as a user interaction cycle that may include a plurality of user interaction points (e.g., authenticating a user, changing user settings or information, completing purchases, user account creation, or other sensitive interaction points with an enterprise or application. In some embodiments, upon authentication, various computing devices on the secure network 214 may indicate to one another that they are authorized to access resources on one another or otherwise communicate, e.g., with the Kerbos security protocol, such as the implementation described in RFC 3244 and RFC 4757, the contents of which are hereby incorporated for by reference. As discussed above, in some embodiments, the domain controller 222 may require a multi-factor authentication (MFA). Once a user of a user computing device 232 completes the MFA, a session may be initiated and stored in the user account repository and a session cookie such as a device cookie may be stored on the user computing device 232. By creating the session, the user of the user computing device 232 does not have to complete the MFA for a time period (e.g., an hour, a day, two days a week, two weeks, a month, two months, or any other time period.

In some embodiments, the session identity protection engine 220 and the browser session security system 212 may be co-located on the same secure network 214, or in some cases portions may be implemented as a software as a service model in which the same browser session security system 212 is accessed by a plurality of different secure networks 214 hosted by a plurality of different tenants. The session identity protection engine 220 and the browser session security system 212 collectively form an example of a distributed application that is referred to as a distributed session identity protection application. Other examples of such an application are described with reference to FIG. 1A. The components are described as services in a service-oriented architecture (e.g., where different functional blocks are executed on different network hosts (or collections thereof) and functionality is invoked via network messages). But embodiments are consistent with other design patterns, e.g., the session identity protection engine 220 and the domain controller 222 may be integrated in the same host or process, the session identity protection engine 220 may operate as an agent on each of the user computing devices, or the session identity protection engine 220, the domain controller 222, and the browser session security system 212 may be integrated on a single host or process.

In some embodiments, the browser session security system 212 may include an application program interface server 234, such as a nonblocking server monitoring a network socket for API requests and implementing promises, callbacks, deferreds, or the like. In some embodiments, the controller 236 may implement the processes described herein by which user information is obtained, and in some cases cracked, validated, stored, and interrogated. In some embodiments, at the direction of the controller 236, for instance responsive to commands received via the API server 234, user information assets stored in a user information asset repository 237 may be interrogated to return an updated full set, or result of comparison to user information determined to have been potentially compromised or indicating fraudulent behavior with the techniques described herein. The user information asset repository 237 may include a malware log repository 238 (e.g., malware logs that include browser data such as credentials, cookies, or other browser information). In some embodiments, the controller 236 is further configured to ingest user information assets with an asset ingestor 240 from various remote sources, such as an untrusted source of user information assets 216 via the Internet 218. Examples of sources of user information assets are described below and include various repositories on the dark web. In some embodiments, received user information assets may undergo various types of processing with the information asset validator 242, for instance, de-duplicate user information with those previously determined to have been retained, cracking credentials published in encrypted form, mapping user identifiers, or associating credentials with other user identifiers. Results may be stored in the user information asset repository 237 and in some cases, one or more the above-described data structures by which user information assets are compared with those in the user account repository 224 may be updated.

The systems of FIGS. 1A and 1B may execute various processes like those described below, though the following processes are not limited by the above implementations, which is not to suggest that any other description herein is limiting. It should be noted that the various processes executed by one or more components of the secure network 214 in FIG. 1B may be executed by one or more of local server 152, client device 104, and local database 142 in FIG. 1A (or vice versa), and the various processes executed by one or more components of the browser session security system 212 in FIG. 1B may be executed by one or more of server 102 and database 132 in FIG. 1A (or vice versa). In other words, the above or below discussed processes executed by one or more components of the computing environment 210 may be executed by one or more components of the computing environment 100 (or vice versa).

Obtaining Malware Logs and Other User Information Assets

Various approaches may be executed to obtain malware logs or portions thereof and other user information assets such as compromised (e.g., breached, brute forced, or phished) confidential information, like compromised credentials, leaked personally identifiable information (like social security numbers), passkey information or other FIDO and WebAuthn security standard based security information that may be used to bypass a passkey authentication. or financial credentials like account numbers, for purposes of detecting that the information has been compromised. In some examples, malware accessing memory could compromise a passkey, as well as the passkey itself. The database 132 and local database 142 illustrated in FIG. 1A or the user information asset repository 237 of FIG. 1B may be populated by collecting data from a plurality of sources and using a plurality of data collection techniques. Although a user information asset repository 237 and a malware log repository 238 is illustrated in FIG. 1B as being part of a browser session security system 212. Data corresponding to leaked or stolen user information assets (including user credentials) may be collected using multiple techniques and from many sources. Some of the techniques for collecting leaked or stolen user information assets include (a) human intelligence (HUMINT) and applied research (HUMINT+TECHNOLOGY) and (b) scanners and automatic collection tools. HUMINT is an information gathering technique that uses human sources, and may include such a human source acquiring a copy of a set of compromised credentials from the dark web. Both the techniques noted above may be implemented in some cases. Although the scanners and automatic collection tools may be relatively efficient at collecting information from the regular web, manual techniques may be needed in some use cases to collect leaked or stolen assets from the deep or dark web, which is not to suggest that purely automated approaches or any other technique is disclaimed.

The above noted techniques, alone or in combination, collect data from several sources. These sources include, but are not limited to (which is not to imply other lists are limiting), private sources, covert sources, active account takeover (ATO) combination lists, stolen assets, infected users, open sources, private forums, dark web markets, tor hidden services, and pastes. Once the data is collected, the data may be cleansed by putting the collected data through a rigorous quality-control process to determine the value of the collected data. After the data is cleansed, a database may be populated based on the cleaned data.

Figure 2:
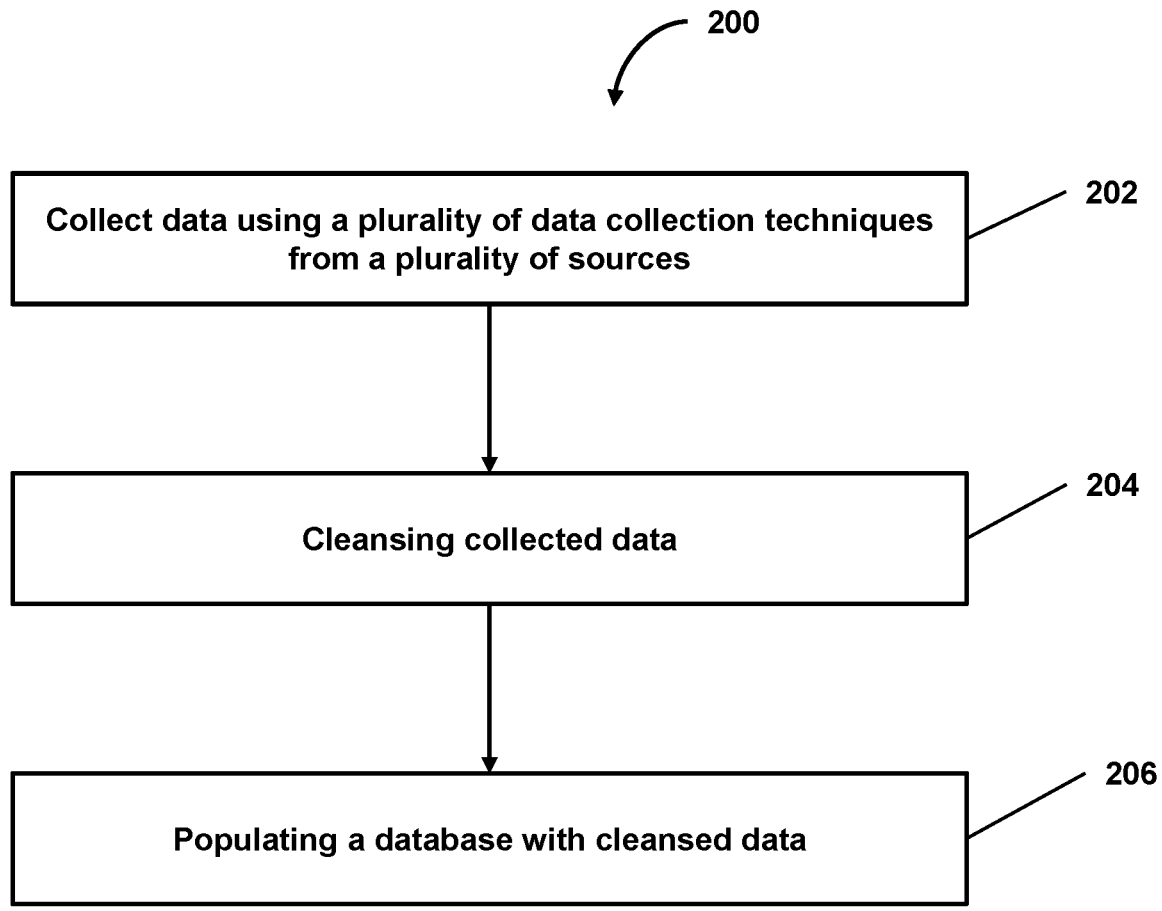
FIG. 2 is a flow chart that illustrates an example process of populating a database suitable for use in the system of FIG. 1A or 1B, in accordance with some embodiments of the present disclosure.

FIG. 2 illustrates an example process 200 of obtaining user information assets like malware logs that include browser files such as cookies or in particular session cookies or device session cookies (e.g., browser files used to authenticate a device such that a MFA is not required each time a user logs into their account. The process 200, like the other processes described herein, may be implemented by executing instructions stored on a tangible, machine-readable medium with one or more processors, in some cases, with different processors executing different subsets of the instructions and with different physical memory or computing devices storing different subsets of the instructions. The processes (which includes the described functionality) herein may be executed in a different order from that depicted, operations may be added, operations may be omitted, operations may be executed serially, or operations may be executed concurrently, none of which is to suggest that any other description is limiting. In some embodiments, the processes herein may be implemented in one or more processors (e.g., a term which refers to physical computing components, like a central processing unit, a GPU, a field-programmable gate array, application-specific integrated circuits, and combinations thereof). The processing devices may include one or more devices executing some or all of the operations of the method in response to instructions stored on an electronic, magnetic, or optical storage medium.

In step 202, in some embodiments, data (for example, exposed or stolen data related to personally identifiable information) may be collected using a plurality of data collection techniques from a plurality of sources. In some examples, the data may include data stolen by malware or other malicious programs where that data is included in malware logs.

After the data is collected, in step 204, the collected data may be cleansed by putting the data through a rigorous quality-control process to determine the value of the collected data. The cleansing of the collected data may include several steps (examples of which are discussed in more detail below with reference to FIG. 3). The cleansing steps include parsing, normalizing, removing duplicates, validating, and enriching. Once the data is cleansed, in step 206, a database may be populated with the cleansed data. This data may then be used to efficiently retrieve user information assets that include cookies associated with a domain as well as user information associated with the device or user account associated with the exposed cookie so that an enterprise may perform a security action such as ending a session or flagging a user account where devices associated with the user of the user account are infected by malware. The data may also be used to efficiently retrieve other compromised sensitive or confidential information related to the user.

Figure 3:
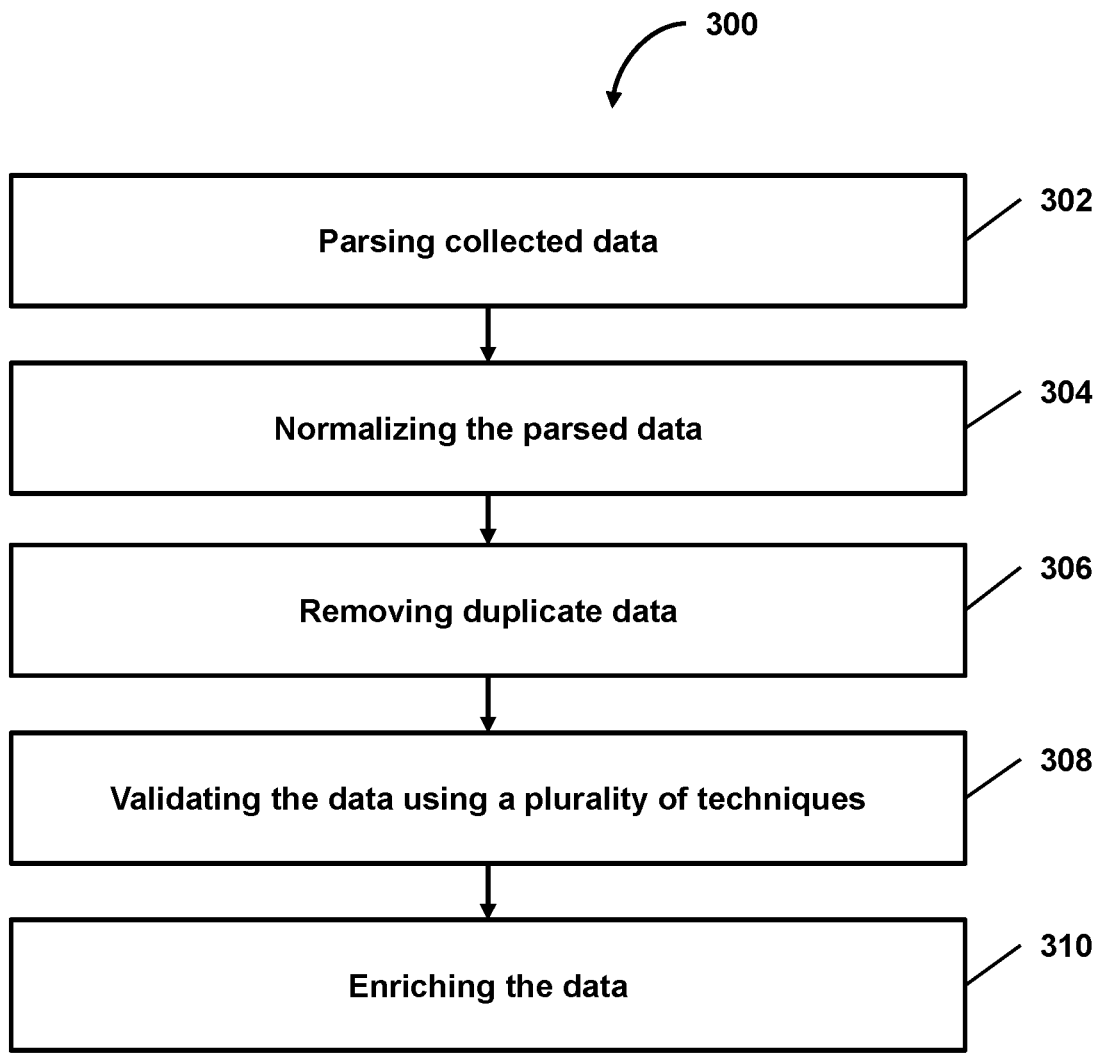
FIG. 3 is a flowchart describing an example of a process of cleansing collected data, in accordance with some embodiments of the present disclosure.

FIG. 3 illustrates an example process 300 of cleansing collected data described in step 204 in FIG. 2. In step 302, in some embodiments, the collected data is parsed and the parsed data is normalized in step 304. During the normalization process, in some embodiments, the data is parsed and classified into different fields (e.g., a date of birth, a username, a password, a domain name, an identification (e.g., a social security number, a driver's license number, a passport number, or the like), an email, a phone number, a name, a street address, malware logs, cookies, or other fields that would be apparent to one of skill in the art in possession of the present disclosure). Also, during the normalization process (or during any step illustrated in FIG. 3), data that is not relevant may be deleted. For example, data records that do not include passwords or high value personal identification information may be discarded.

In step 306, duplicate data may be removed. During this step, in some embodiments, the normalized data may be compared to more than one or ten billion assets already stored in the database 132 (for example, the data collection database 134) or local database 142 (for example, the data collection database 144) and data that are duplicates may be discarded. In some cases, the above techniques configured to expedite pairwise matching of sets may be implemented to perform deduplication. Although duplicate data may be discarded, the database 132 or local database 142 may keep a record of a number of duplicates that were retrieved from unique sources.

In step 308, the data may be then validated using a plurality of techniques. Routines such as "validation rules," "validation constraints," or "check routines" may be used to validate the data so as to check for correctness and meaningfulness. The rules may be implemented through the automated facilities of a data dictionary, or by the inclusion of explicit application program validation logic.

Finally, in step 310, the data may be enriched so that the database 132 (for example, the data collection database 134) or local database 142 (for example, the data collection database 144) may be populated with, for example, how many times user credentials have been ingested from a unique source, the severity of each individual record, and additional metadata combined from different sources.

The populated database 132 (for example, the data collection database 134 or repository 238) or the local database 142 (for example, the data collection database 144) may take a number of forms, including in memory or persistent data structures, like ordered/unordered flat files, Indexed Sequential Access Method (ISAM), heap files, hash buckets, or B+ trees. In some embodiments, the data may be relatively frequently (e.g., more than once a week on average) collected, cleansed, and populated.

Retrieval of Logs Associated with Browser Sessions Via an External Computer System for Browser Session Identity Protection As noted above, browser session identity protection is important to protect legitimate users of enterprise applications and enterprise assets themselves from malicious actors. Some of the present techniques afford efficient and proactive ways of retrieving user information assets (for example, malware logs that include session cookies used for account takeover) that are associated with a user identification or a domain, compiling a session identity protection response with compromised cookie data, and providing that session identity protection response that includes the cookie data and other user information assets associated with the cookie data in response to the query so that a security action or inaction may be performed based on the session identity protection response. FIG. 1A illustrates a system that facilitates efficient and proactive ways of retrieval of user information assets and session identity protection. In some embodiments, an enterprise may screen its consumer-facing domains or workforce-facing domains including subdomains provisioned by third parties (e.g., Okta) for possible session identity take over. In a specific example, an administrator may generate a session identity protection request via a client device 104 or the local server 152 to the API 112 on the server 102 via the network 150. The session identity protection request may include at least a domain name (e.g., customersite.com or app.customersite.com) but may include other cookie information such as a cookie name, a cookie expiration data, a database publish date or other parameters to filter a search. In a specific example, the session identity protection engine 220 may query the application program interface server 234 such that the browser session security system 212 generates a session identity protection response as discussed below and returns the session identity protection response to the session identity protection engine 220. The session identity protection response may include compromised cookie data that is associated with one or more accounts.

In some embodiments, the local server 152 may be any server that authenticates any user account. For example, in some embodiments, the local server 152 may be a server associated with a website or a company, and the local server 152 may grant access to the website or an enterprise's network resources when the user credentials match stored user credentials. In this example, the client device 104 may be a customer that seeks to access a website using the customer's user credentials or may be an employee of a company that seeks to access information within a company's network. In some embodiments, the server 102 may be a third-party server that offers services of providing data (for example, exposed or stolen user credentials, a session identity protection, or the like) associated with, for example, a user account to prevent account take over (e.g., prevent hacking) of the user account.

In some embodiments, once the local server 152 grants access to the user of the client device 104 to access a user account or before granting access, the client device 104 or the local server 152 (via the communication subsystem 164) may automatically generate a session identity protection query and send the session identity protection query, via the network 150, to the server 102 in order to receive an session identity protection response associated with the user identification and domain. However, in other embodiments, an enterprise administrator may perform a manual session identity protection query via a user interface where the enterprise administrator enters the domain or other cookie data and generates a session identity protection API query with the application program interface server 234. The session identity protection query may identify a domain (e.g., the enterprises domain or a third-party domain (for example, that was entered by the user of the client device 104 to access a user account)). The session identity protection query may also identify other information related to a cookie, user, a date range of when a user information asset was published (e.g., when a malware log was retrieved), for example, a cookie name, a cookie expiration date, a cookie value, or other data that may be useful in identifying cookies and filtering cookies. The session identity protection query may be obtained by the server 102 via SSL (Secure Sockets Layer), TLS (Transport Layer Security), or various other protocols. In some embodiments, a session identity protection query does not necessarily have to be sent to the server 102 in response to the user logging into (or attempting to login) a user account using the user credentials. The session identity protection query may be sent to the server 102 at another time and may identify a plurality of user identifications associated with a plurality of users and user accounts. For example, the local server 152 (or a client device 104 acting as an administrator) may request retrieval of a session identity protection response for a plurality of users or a plurality of domains. Accordingly, the local server 152 (or client device 104) may generate a session identity protection query that identifies a plurality of user identifications or domains and send the session identity protection query to the server 102 (for example, via network 150) in order to retrieve session identity protection responses associated with the plurality of user identifications or domains. The session identity protection query may include a request for session identity protection directed to the API 112 in the server 102. In some embodiments, the session identity protection query may be automatically generated at a predetermined time set by the local server 152 or client device 104 (for example, an administrator).

In some embodiments, the session identity protection query may be received by the server 102 (for example, via the communication subsystem 114) and may be routed to the API 112. In response to the query, the API 112 may generate a search query configured to retrieve data (e.g., malware logs or cookies) related to the domain or other cookie parameters (which may be identified in the session identity protection query) from the database 132 (for example, data collection database 134). Prior to sending the search query, the server 102 may determine one or more criteria for the search query to make the search process more efficient. The search query may be an SQL (Structured Query Language), an MDX (Multidimensional Expressions) query, or the like.

In some embodiments, one or more criteria for the search query may be generated by the server 102 based on various factors. For example, a criterion of the search query (e.g., a value of a field in a where clause) may be determined based on whether another query identifying the same domain has been previously obtained. In other words, the server 102 (for example, the monitoring subsystem 116) may determine whether the domain (that is received in the current query) has also been previously obtained in one or more previous queries. Whenever a search query identifying a domain is obtained, the server 102 may keep a record (for example, metadata related to the query) of such a search query in its miscellaneous database 136. Such a record may include a date and time of the obtained search query, a location (for example, IP address) from where the search query is received, a domain identified in the obtained session identity protection query, or various other data related to the domain or a user identification and the obtained session identity protection query.

In some embodiments, in response to receiving a session identity protection query identifying the domain, the server 102 may retrieve data (e.g. metadata), via the API 112, from the miscellaneous database 136, associated with one or more domain entries in the miscellaneous database 136 that matches the domain in the received session identity protection query. In other words, the server 102 may retrieve (for example, from the miscellaneous database 136), via the API 112, other information related to the previously obtained session identity protection query when (e.g., in response to an event in which) the domain in the current session identity protection query matches one or more user identifications stored in the miscellaneous database 136. For instance, the server 102 may retrieve a previous date and time the domain was obtained in the previous session identity protection query and use this date and time to generate a search criterion for the search query. When it is determined that the domain has been previously obtained in another session identity protection query, the search for data related to the domain from the database 132 (for example, the data collection database 134) may be limited to, for example, data that has been populated on or after the date (or time) the domain was previously obtained in the other session identity protection query. In some embodiments, when (e.g., in response to an event in which) the server 102 (via, for example, the monitoring subsystem 116) determines that another session identity protection query identifying the same domain (which was identified in the current session identity protection query) has been previously obtained, the server 102 may generate a search criterion such that data (related to the domain) that is retrieved from the database 132 (for example, data collection database 134) corresponds to data that was populated into the database 132 (for example, data collection database 134) on or after a date or time of the previously obtained session identity protection query. In this example, data collection database 134 may include the data collected, cleansed, and populated, as described above with regard to FIGS. 2 and 3, and miscellaneous database 136 may include other miscellaneous data (for example, information regarding time and date of a received session identity protection query, a location of a received query, etc.) related to domains.

In some embodiments, once the search query and the search criterion are generated, data associated with one or more domains in the data collection database 134 that matches the domain identified in the current session identity protection query is retrieved, via the API 112, from the database 132 (for example, data collection database 134) based on the search query and the criterion for the search query. In some embodiments, when (e.g., in response to an event in which) it is determined that the domain has not been previously identified in a previous session identity protection query, the search criterion may cause embodiments to require the entire data collection database 134 to be searched in order to retrieve data (for example, cookies associated with the domain or malware logs) associated with one or more domain entries in the database that matches the domain identified in the current session identity protection query. On the other hand, when (e.g., in response to an event in which) it is determined that the domain has been previously identified in a previous session identity protection query, the search criterion may cause embodiments to require only a portion of the data collection database 134 (the portion that includes data populated on or after the date or time the previous query was obtained) to be searched in order to retrieve data (for example, cookies or malware logs) associated with one or more domain entries in the database that matches the domain identified in the current session identity protection query. Accordingly, server 102 may retrieve, via the API 112, from a portion of the data collection database 134, data (for example, malware logs) associated with one or more domain entries in the data collection database 134 that match the domain identified in the current query. The database 132 may be indexed in such a manner that data populated in the data collection database 134 at different times can be easily distinguished during a search process. In some embodiments, the data retrieved from the data collection database 134 may include metadata associated with the one or more passwords retrieved from the data collection database 134. Such metadata may include a date of exposure of the one or more cookies, a number of exposures of the one or more cookies, or a location of exposure of the one or more cookies.

This makes the data retrieval process more efficient relative to simpler data access techniques. Allowing the search to be performed on only a portion (or subset) of a database decreases the time taken to retrieve data associated with the domain, reduces the use of computer resources of, for example, the server 102, and provides the retrieved data to a recipient sooner so that the recipient may act on such data in a quicker manner, thereby preventing account takeover sooner than later. In other words, in some embodiments, the entire database may not need to be searched and only a portion (or subset) of the database may need to be searched to retrieve data related to the domains, none of which is to suggest that simpler data access techniques or any other subject matter are disclaimed.

In some embodiments, the data retrieved from the data collection database 134 may include, for example, user information assets associated with the domain such as the user information assets discussed above. While the search may be domain-based or based on other cookie criteria, the search results may still be referred to user information assets that include user associated cookies, malware logs, credentials, or the like. Specifically, the user information assets may include a source identifier, a cookie domain, a cookie name, a cookie value, a cookie expiration, a database publish date (e.g., date that the user information asset was obtained in process 200 of FIG. 2, infected host data (e.g., Internet protocol address, a machine ID, a user hostname), or other information that would be apparent to one of skill in the art in possession of the present disclosure.

The retrieved data from the data collection database 134 may be temporarily stored in the miscellaneous database 136 along with the domain. Temporarily storing the retrieved data associated with the domain in the miscellaneous database 136 may allow retrieval of such data in view of a subsequent query (identifying the cookies) received from the local server 152 or another server (not shown). Such temporary storage may be helpful to retrieve data quickly from miscellaneous database 136 (compared to retrieving the data from the data collection database 134, which may take more time) when subsequent one or more queries (identifying the same domain) is obtained from one or more sources within a predetermined amount of time. In some cases, it may be quicker to retrieve data associated with the domain from the miscellaneous database 136 (which may be smaller than the data collection database 134). Retrieving the data associated with the domain from miscellaneous database 136 may use fewer computer resources (compared to retrieving the data associated with the user identification from the data collection database 134) of the server 102. Further, retrieving the data associated with the domain from the miscellaneous database 136 may result in providing the retrieved data to a recipient (for example, the local server 152 or any other external computer system) sooner so that the recipient may act on such data in a quicker manner, thereby preventing account takeover sooner than later.

In some embodiments, the retrieved data may include metadata associated with the one or more retrieved user information assets. Such metadata may include a date and time of the malware log, a number of exposures of the malware log, or a location of exposure of the malware log, or other meta data that would be apparent to one of skill in the art in possession of the present disclosure. The date and time of exposure of the user information assets may correspond to the date and time at which the one or more passwords was collected during the collection of data using a plurality of data collection techniques from a plurality of sources in step 202 of FIG. 2. During the step of collecting data in step 202 of FIG. 2, the collected data may be correlated with a date and time of collection of the data. In some embodiments, the date and time of exposure of the user information assets may correspond to the date and time at which the user information asset was exposed within the source.

In some embodiments, the retrieved data may include a number of exposures of the user information assets. For example, the same user information assets associated with a domain may be exposed within a plurality of sources. Accordingly, a record might be kept in the data collection database 134 regarding a number of exposures of the same user information asset. In other words, the data collection database 134 may keep a record of a number of sources from which the same user information asset (associated with a domain) was collected during the data collection and data cleansing steps illustrated in FIGS. 2 and 3. Further, in some embodiments, the retrieved data may include a location of where the malware log or cookies or other information in the malware log was found. During the data collection step 202, a record may be kept of the location from which the data is collected. For example, a user information asset (associated with a domain) may have been exposed on the dark web or a blog post, and such information regarding the location of the exposure may be collected during the data collection step 202 in FIG. 2 and may be retrieved in response to a query identifying the user identification. Such retrieved data may be sent to the local server 152 (i.e., received by the local server 152) in response to a session identity protection query identifying the domain. It should be understood that all the data retrieved by the server 102 may be sent to the local server 152.

In some embodiments, the scheduled operation may also be configured to request the local server 152 (or client device 104) to provide instructions on whether the local server 152 (or client device 104) may determine to search the data collection database 134 for additional exposed domain logs associated with the domain within a predetermined amount of time after the query (identifying the domain) is obtained.

Notification of Session Identity Protection to Perform Security Action

As discussed above, server 102 or server 152 may generate a session identity protection response that may include compromised session identity data for vulnerable accounts (e.g., a source identifier, a cookie domain, a cookie name, a cookie value, a cookie expiration, a publish date, infected host data about the user and user device that is infected or other data that would be apparent to one of skill in the art in possession of the present disclosure. The session identity protection response may be received in response to a session identity protection condition being satisfied. For example, in response to a user attempting to login to a domain (for example, via client device 104), completing a transaction, changing a user account, initiating a user account, in response to a request of an administrator running a general session identity protection query (for example, client device 104), at predetermined time intervals, when the number of active sessions (session cookies or device cookies for multi-factor authentication) has satisfied a session threshold for the domain, or any other session identity protection condition.

In some embodiments, when the session identity protection response is generated by the server 102, the server 102 may send the session identity protection response to the local server 152 via network 150. Alternatively, in some embodiments, the session identity protection response associated with the domain may be retrieved by the local server 152 or provided to the local server 152 in response to a session identity protection query to the API 112. The session identity protection response may include the comprised cookie data and associated user or device identifiers for vulnerable accounts. Although the techniques below may be described to be performed by the local sever 152, it should be understood that such techniques can be performed by server 102.

Once the session identity protection response is received, the session identity protection engine 220 or the monitoring subsystem 116 may determine whether to perform a security action or not. The security action may be performed if the session identity data included in the session identity protection response satisfies a security action condition. In some embodiments, the session identity data included in the session identity protection response may contribute to determining whether the security action condition is satisfied where one or more security actions are associated with each security action condition is satisfied. In some embodiments, a set of security actions of a plurality of security actions may be performed if the session identity data satisfies conditions. If the security action condition is not satisfied, the session identity protection engine 220 or the monitoring subsystem 166 may proceed with the user interaction cycle as intended by completing the interaction point and proceed to the next interaction point of the user interaction cycle. In another example, a notification may be provided to the administrator that no security action is required. If the security risk condition is satisfied, a security action may be performed so that one or more user accounts identified by session identity data (e.g., via infected host data (e.g., IP address, a machine identifier, user hostname, or the like) a cookie value, or other session identity data) are flagged as being infected with malware such that increased security may be performed when those users use the secure network 214 or other enterprise resources. In another example, the session identity protection engine 220 or the monitoring subsystem 166 may invalidate the compromised sessions such that the breach information that is available to malicious actors on the Internet is useless.

In some embodiments, a user may be currently accessing the user account when it is determined that the session identity data satisfies the security condition. In such an instance, the local server 152 may notify the user of the user account that the user account has been exposed, that the functionalities (certain essential functionalities of the user account) of the user account may be disabled within a predetermined amount of time, to reset the password for the user account immediately, to change the security questions and answers associated with the user account, to inform the user which device of the user's device has malware installed, or other notifications. As noted above, certain functionalities of the account may be disabled by the local server 152, thereby, forcing the user of the user account to take immediate action in resetting the password of the user account or changing the security questions and answers and removing malware. Further, in some embodiments, the local server 152 may also automatically log out the user from the user account after a certain period and require a new multi-factor login such that a new cookie is generated. By logging the user out, invaliding the compromised session, and requiring a new user authentication that requires a multi-factor authentication, a current user of the user's user account may be determined to be a valid user if they can complete the multi-factor authentication as the previous cookie for the multi-factor authentication had been invalidated and can no longer serve as a means to mirror that user's browser fingerprint and cookie data.

In some embodiments, a user of the user account may not be currently accessing the user account or in a user interaction cycle when it is determined that the session identity protection data satisfies a security condition. In such an instance, the local server 152 may require a new multi-factor authentication to access the user account whenever the user of the user account attempts to access the user account and invalidates any session cookies when the user logs out of the account such that a multi-factor authentication is required each time the user logs into the account. In any of the examples or alternatively, the security action may also alert an administrator that is either checking session identity protection or that receives security risk notifications from the session identity protection engine 220 or monitoring subsystem 166. Such a notification may be via email, text, phone call, or any form of communication to notify the user or administrator of the user account to set up other safeguards to limit security risk.

Figure 4:
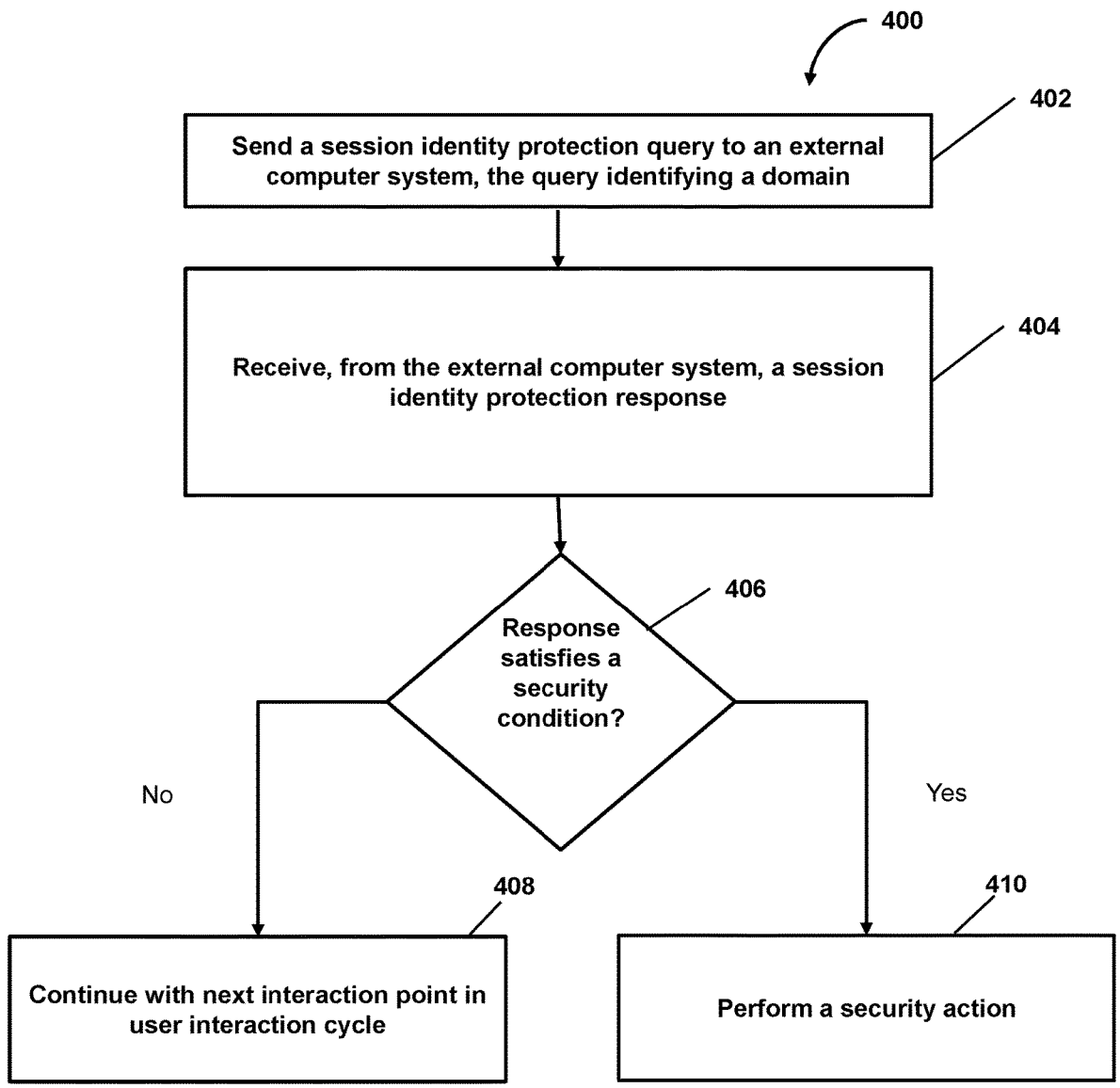
FIG. 4 is a flowchart of an example process that facilitates prevention of account takeover by receiving data associated with browser session logs for a domain, in accordance with some embodiments of the present disclosure.

FIG. 4 illustrates an example process 400 that impedes security threats to enterprise resources by receiving a session identity protection response that includes session identity protection data associated with a domain from an external computer system. In step 402, a session identity protection query identifying a domain (e.g., a cookie domain) may be sent to an external computer system. In addition to the domain, the session identity protection query may also identify other information related to the domain, a particular user, search criteria (e.g., a cookie name, a cookie expiration date, publish data, or other search criteria) to filter session identity protection data. In response to the session identity protection query, the external communication system may provide, via an application programming interface, a session identity protection response that may include a session identity protection data (see step 404 in FIG. 4). In some embodiment, the external computer system may obtain, from a database, user information assets associated with the domain provided in the session identity protection query in the database that matches the domain or using the other search criteria provided in the session identity protection query. The user information assets may be received from the external communication system and may include malware logs, cookies, or other user or device information that is associated with each malware log or cookie, or other information. The retrieved user information assets may also include metadata associated with the user information assets. For example, the retrieved user information assets may include date and time metadata associated with the user information assets, a location of exposure of the user information assets, a number of duplicates, or other metadata. All the retrieved user information assets may be received by the external computer system. The process of retrieving the user information assets from the database is described above. Accordingly, for the sake of brevity, the process of retrieving the user information assets is not repeated. The external computer system may generate a session identity protection response that includes session identity protection data from the user information assets.

In decision step 406, in some embodiments, a determination as to whether the session identity protection data included in the session identity protection response satisfies a security condition. In some cases, the session identity protection data may be used to determine whether to perform a security action for a user or session that is associated with the domain and associated with the session identity protection data included in the session identity protection data in step 410 or to continue with a user interaction cycle uninterrupted in step 408.

In step 408, in some embodiments, when the session identity protection data does not satisfy the security condition users of the domain or a particular user may continue with the next interaction point in a user interaction cycle that includes a plurality of sequential user interaction cycle points and the user interaction cycle is with an application or enterprise system. In other examples, a notification may be provided to an administrator that no session identities are compromised.

If at step 406, session identity protection data satisfies the security condition, the process 400 may proceed to step 410, where a security action is performed. For example, a security action may include blocking user's access from a user account, blocking edits to a user account, blocking user account initiation, notifying an administrator of the jeopardized session and user, notifying the user that malware is installed on their device, invalidating one or more cookies, changing a username or password, requiring additional security interaction points in a user interaction cycle to prevent account takeover, preventing a transaction from occurring, or any other security action that is discussed herein or that would be apparent to one of skill in the art in possession of the present disclosure. By performing a security action, the present techniques help prevent account take over by third parties thereby preventing financial losses and losses relating to confidential information.

Figure 5:
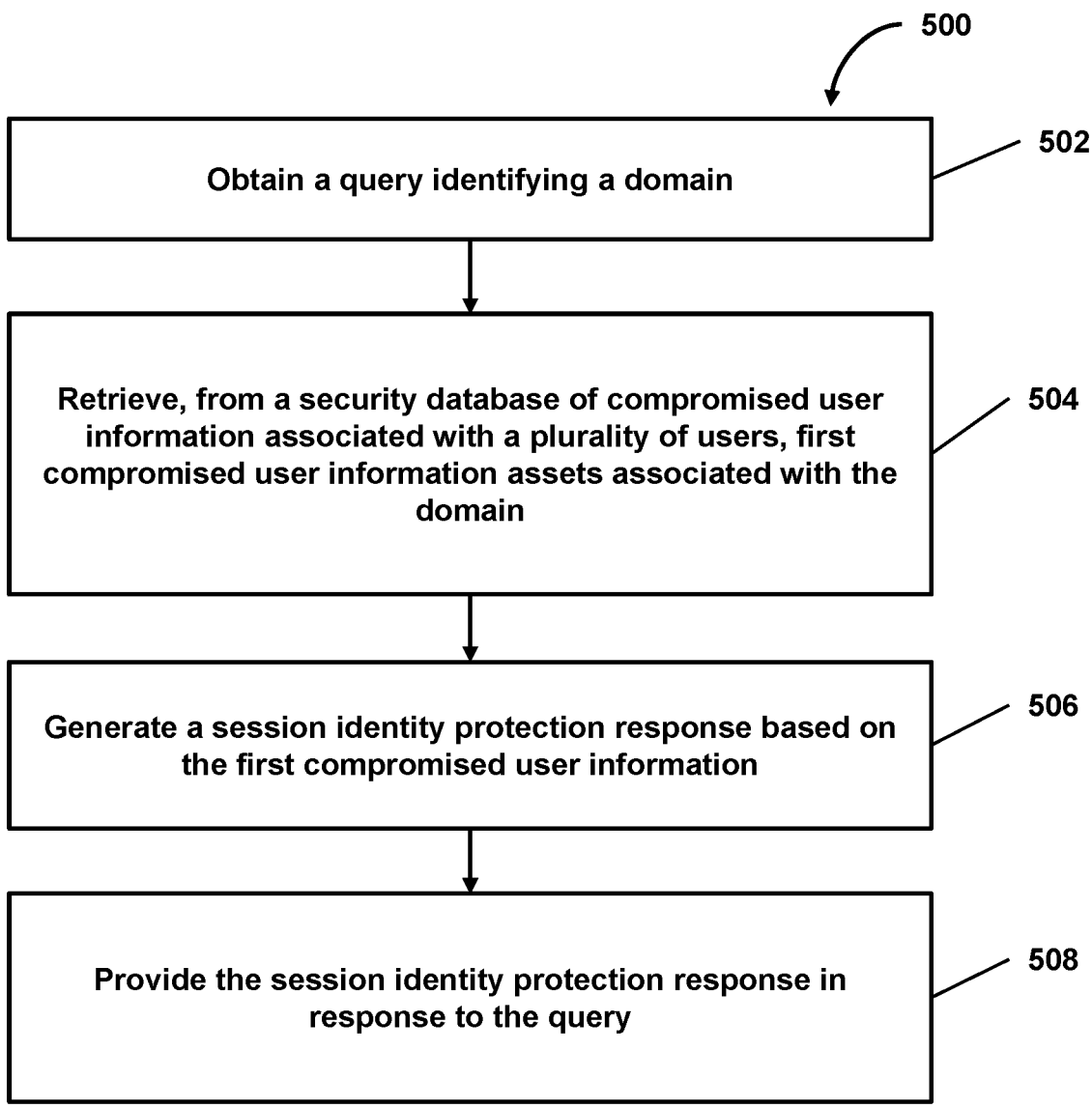
FIG. 5 is a flowchart of an example process that facilitates prevention of account takeover by retrieving data associated with browser session logs for a domain, in accordance with some embodiments of the present disclosure.

FIG. 5 illustrates an example process 500 that impedes security threats to enterprise resources and applications by generating a session identity protection response associated with a domain from an enterprise computer system. The systems and methods identify malware logs, compromised cookies of a domain that provide session information that may be used for account take over, and users or user devices associated with the compromised information. In step 502, a session identity protection query identifying a domain and, in some examples, other information or search criteria may be obtained from an enterprise computer system. In addition to domain identification, the session identity protection query may also identify other information related to the user identification and a user (e.g., a user identifier or device identifier). In response to the session identity protection query, the computer system may retrieve, at step 504 and from a database, user information assets associated with the domain in the database that matches the domain provided in the session identity protection query and the user information assets may be received from the external communication system. The retrieved user information assets may also include metadata associated with the user information assets. For example, the retrieved user information assets may include date and time metadata associated with the user information assets, a location of exposure of the user information assets, when the user information asset was stored in the database or other metadata. All of the retrieved user information assets may be received by the external computer system. The process of retrieving the user information assets from the database is described above. Accordingly, for the sake of brevity, the process of retrieving the user information assets is not repeated. At step 506, the external computer system may generate a session identity protection response that includes session identity protection data based on the user information assets and provide, at step 508, the session identity protection response that includes session identity protection data to the enterprise computer system that made the session identity protection query. The enterprise computer system may perform various security actions based on the received session identity protection data as described above in process 400 of FIG. 4.

Thus, systems and methods of the present disclosure provide an efficient process for determining compromised cookies for a domain or third-party domain incorporated into an enterprise application or enterprise resources by obtaining information from large databases of available user information assets (e.g., malware logs and exposed cookies for user application sessions) on the Internet, generating a session identity protection response, and providing that session identity protection response to the enterprise system to perform a security action determination. Using queries across a database that has more than 10 million user information assets, the systems and the methods of the present disclosure can return a real-time (e.g., 500 msec-1000 msec) session identity protection response such that quick intervention of security threats may be detected and eliminated by the enterprise system before account takeover or other malicious activities are performed.

Figure 6:
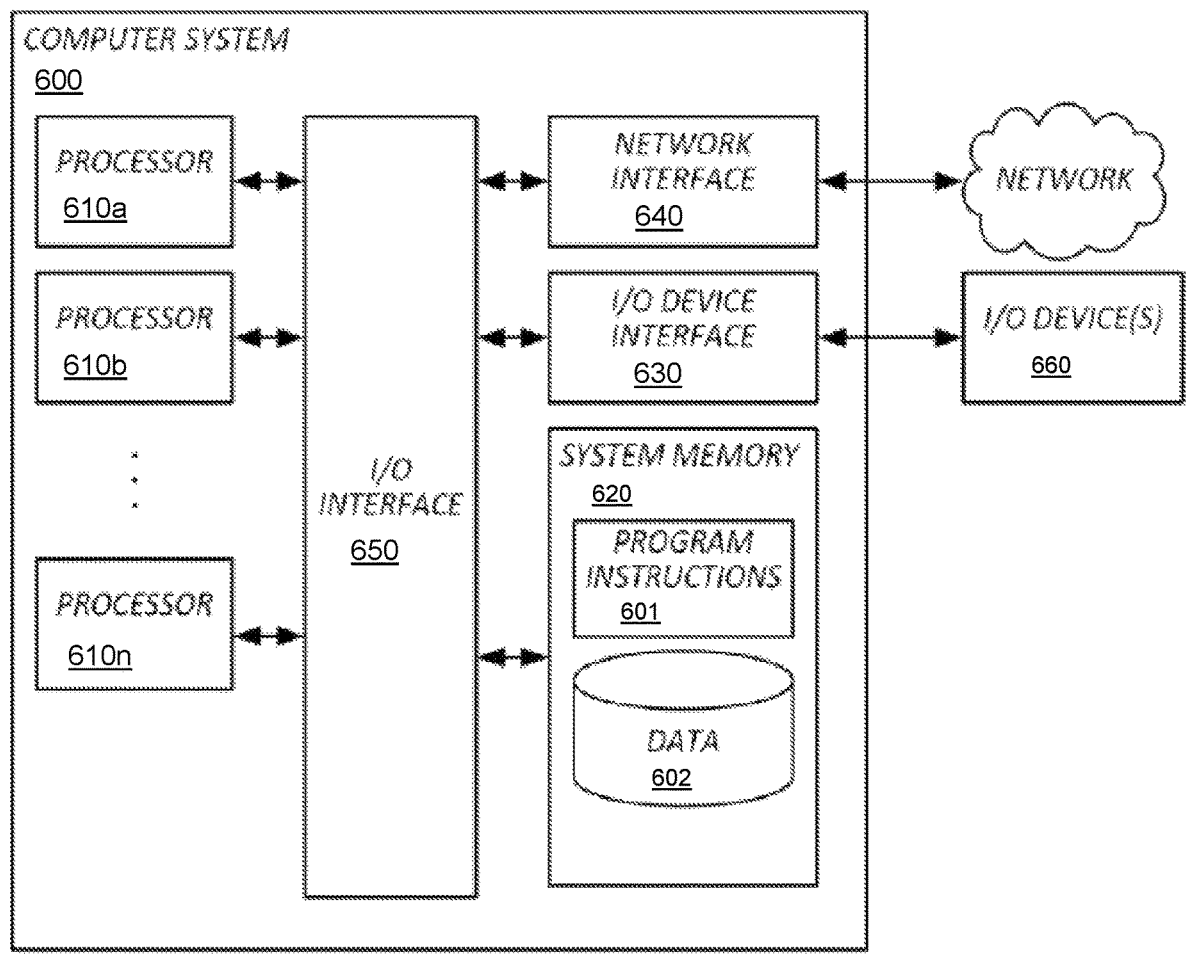
FIG. 6 is an example of a computing device by which the above techniques may be implemented.

FIG. 6 is a diagram that illustrates an exemplary computing device 600 in accordance with embodiments of the present technique. Various portions of systems and methods described herein, may include or be executed on one or more computer systems similar to computing device 600. Further, processes and modules described herein may be executed by one or more processing systems similar to that of computing device 600.

Computing device 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing device 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 600 may include a plurality of computing devices (e.g., distributed computer systems) to implement various processing functions.

I/O device interface 630 may provide an interface for connection of one or more I/O devices 660 to computing device 600. I/O devices may include devices that receive input (e.g., from a user) or output information (e.g., to a user). I/O devices 660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing device 600 through a wired or wireless connection. I/O devices 660 may be connected to computing device 600 from a remote location. I/O devices 660 located on remote computer system, for example, may be connected to computing device 600 via a network and network interface 640.

Network interface 640 may include a network adapter that provides for connection of computing device 600 to a network. Network interface 640 may facilitate data exchange between computing device 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 601 or data 602. Program instructions 601 may be executable by a processor (e.g., one or more of processors 610a-610n) to implement one or more embodiments of the present techniques. Instructions 601 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 600 or multiple computing device 600 configured to host different portions or instances of embodiments. Multiple computing devices 600 may provide for parallel or sequential processing/execution of one or more portions of the techniques described herein.

Those skilled in the art will appreciate that computing device 600 is merely illustrative and is not intended to limit the scope of the techniques described herein. Computing device 600 may include any combination of devices or software that may perform or otherwise provide for the performance of the techniques described herein. For example, computing device 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 600 may be transmitted to computing device 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: receiving, by a computer system, a session identity protection query that includes a target domain; accessing, by the computer system, a security database of compromised cookie data associated with a plurality of domains; determining, by the computer system, the target domain is associated with first compromised cookie data of the compromised cookie data included in the security database; and providing, by the computer system, the first compromised cookie data in response to the session identity protection query.

2. The medium of embodiment 1, wherein the first compromised cookie data includes at least one of a source identifier, a cookie domain, a cookie name, a cookie value, a cookie expiration, a publish date of the first compromised cookie data, a machine identifier that is infected with a malicious program that caused a cookie to become compromised, an internet protocol address, a user hostname, or a user system registered owner from a malware log or a compromised cookie returned in a search query when determining that the target domain is associate with the first compromised cookie data.

3. The medium of any one of embodiments 1-2, wherein the session identity protection query includes a cookie domain.

4. The medium of embodiment 3, wherein the session identity protection query includes at least one of a cookie name, a cookie expiration date, a source identifier, or a date range.

5. The medium of any one of embodiments 1-4, wherein the operations further comprise: flagging user accounts associated with compromised devices determined from the first compromised cookie data.

6. The medium of embodiment 5, wherein the operations further comprise: performing a multi-factor authentication during login of a user of a user account that is included in the flagged user accounts even if the user account has a session cookie for bypassing the multi-factor authentication.

7. The medium of any one of embodiments 1-6, wherein the operations further comprise: invalidating cookies that are identified in the first compromised cookie data.

8. The medium of any one of embodiments 1-7, wherein the operations further comprise: deactivating a session at the target domain that is associated with a cookie identified in the first compromised cookie data.

9. The medium of any one of embodiments 1-8, wherein the operations further comprise: notifying a user associated with the first compromised cookie data that a user device identified in the first compromised cookie data is infected with a malicious application.

10. The medium of any one of embodiments 1-9, wherein the operations further comprise: updating, by the computer system, the security database with updated compromised information associated with the domain.

11. The medium of embodiment 10, wherein the operations further comprise: performing a search query based on the session identity protection query on only the updated compromised information to obtain second compromised cookie data from the updated compromised information; determining the target domain is associated with the second compromised cookie data; and providing the second compromised cookie data as an update to the session identity protection query.

12. The medium of any one of embodiments 1-11, wherein the session identity protection query originates from an application.

13. The medium of any one of embodiments 1-12, wherein the session identity protection query is an application programming interface (API) query.

14. The medium of any one of embodiments 1-13, wherein the security database includes over one billion user information assets that include the compromised cookie data.

15. The medium of any one of embodiments 1-14, wherein the first compromised cookie data of the compromised cookie data is retrieved within 500-900 msecs.

16. The medium of any one of embodiments 1-15, wherein the session identity protection query that includes a target domain is generated in response to an event occurring on an enterprise system.

17. The medium of embodiment 16, wherein the event includes a user action that satisfies a suspected account takeover condition.

18. The medium of any one of embodiments 1-17, wherein the operations further comprise steps for: identifying the first compromised cookie data.

19. The medium of any one of embodiments 1-18, wherein the operations further comprise steps for: populating the security database.

20. A method comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
   receiving, by a computer system, a session identity protection query that includes a target domain;
   accessing, by the computer system, a security database of compromised cookie data associated with a plurality of domains, wherein the compromised cookie data includes data to emulate a browser fingerprint of a user's web browser;
   determining, by the computer system, the target domain is associated with first compromised cookie data of the compromised cookie data included in the security database; and
   providing, by the computer system, the first compromised cookie data in response to the session identity protection query.

2. The medium of claim 1, wherein the first compromised cookie data includes at least one of a source identifier, a cookie domain, a cookie name, a cookie value, a cookie expiration, a publish date of the first compromised cookie data, a machine identifier that is infected with a malicious program that caused a cookie to become compromised, an internet protocol address, a user hostname, or a user system registered owner from a malware log or a compromised cookie returned in a search query when determining that the target domain is associate with the first compromised cookie data.

3. The medium of claim 1, wherein the session identity protection query includes a cookie domain.

4. The medium of claim 3, wherein the session identity protection query includes at least one of a cookie name, a cookie expiration date, a source identifier, or a date range.

5. The medium of claim 1, wherein the operations further comprise:
   flagging user accounts associated with compromised devices determined from the first compromised cookie data.

6. The medium of claim 5, wherein the operations further comprise:
   performing a multi-factor authentication during login of a user of a user account that is included in the flagged user accounts even if the user account has a session cookie for bypassing the multi-factor authentication.

7. The medium of claim 1, wherein the operations further comprise:
   invalidating cookies that are identified in the first compromised cookie data.

8. The medium of claim 1, wherein the operations further comprise:
   deactivating a session at the target domain that is associated with a cookie identified in the first compromised cookie data.

9. The medium of claim 1, wherein the operations further comprise:
   notifying a user associated with the first compromised cookie data that a user device identified in the first compromised cookie data is infected with a malicious application.

10. The medium of claim 1, wherein the operations further comprise:

updating, by the computer system, the security database with updated compromised information associated with the domain.

11. The medium of claim 10, wherein the operations further comprise:
performing a search query based on the session identity protection query on only the updated compromised information to obtain second compromised cookie data from the updated compromised information;
determining the target domain is associated with the second compromised cookie data; and
providing the second compromised cookie data as an update to the session identity protection query.

12. The medium of claim 1, wherein the session identity protection query originates from an application.

13. The medium of claim 1, wherein the session identity protection query is an application programming interface (API) query.

14. The medium of claim 1, wherein the security database includes over one billion user information assets that include the compromised cookie data.

15. The medium of claim 1, wherein the first compromised cookie data of the compromised cookie data is retrieved within 500-900 msecs.

16. The medium of claim 1, wherein the session identity protection query that includes a target domain is generated in response to an event occurring on an enterprise system.

17. The medium of claim 16, wherein the event includes a user action that satisfies a suspected account takeover condition.

18. The medium of claim 1, wherein the operations further comprise steps for:
identifying the first compromised cookie data.

19. The medium of claim 1, wherein the operations further comprise steps for:
populating the security database.

20. A method, comprising:
receiving, by a computer system, a session identity protection query that includes a target domain;
accessing, by the computer system, a security database of compromised cookie data associated with a plurality of domains, wherein the compromised cookie data includes data to emulate a browser fingerprint of a user's web browser;
determining, by the computer system, the target domain is associated with first compromised cookie data of the compromised cookie data included in the security database; and
providing, by the computer system, the first compromised cookie data in response to the session identity protection query.

* * * * *